United States Patent
Kondo

(10) Patent No.: US 10,184,805 B2
(45) Date of Patent: Jan. 22, 2019

(54) METHOD FOR DETECTING ABNORMALITY OF RESOLVER, ANGLE DETECTION DEVICE, MOTOR, AND TRANSPORTATION DEVICE

(71) Applicant: NSK LTD., Shinagawa-ku, Tokyo (JP)

(72) Inventor: Kei Kondo, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 15/341,251

(22) Filed: Nov. 2, 2016

(65) Prior Publication Data
US 2017/0074679 A1 Mar. 16, 2017

Related U.S. Application Data

(63) Continuation of application No. 14/888,462, filed as application No. PCT/JP2013/007484 on Dec. 19, 2013.

(30) Foreign Application Priority Data

May 15, 2013 (JP) ................................. 2013-103395

(51) Int. Cl.
*H02P 29/024* (2016.01)
*G01D 3/08* (2006.01)
(Continued)

(52) U.S. Cl.
CPC .............. *G01D 3/08* (2013.01); *G01D 3/028* (2013.01); *G01D 5/20* (2013.01); *G01D 5/2073* (2013.01);
(Continued)

(58) Field of Classification Search
CPC ........ G01D 5/20; G01D 5/204; G01D 5/2046; G01D 5/2073; G01D 5/208; G01D 5/2086;
(Continued)

(56) References Cited

U.S. PATENT DOCUMENTS

2010/0045227 A1 2/2010 Ura et al.
2010/0327786 A1 12/2010 Aoki et al.
(Continued)

FOREIGN PATENT DOCUMENTS

JP 2001-343253 A 12/2001
JP 2008-197061 A 8/2008
(Continued)

OTHER PUBLICATIONS

English machine translation of the description and claims of JP2013-44679, obtained from a website of the Japanese Patent Office, obtained on Dec. 12, 2016.*
(Continued)

*Primary Examiner* — David M Schindler
(74) *Attorney, Agent, or Firm* — Crowell & Moring LLP

(57) ABSTRACT

There are provided a method for detecting an abnormality of a resolver, an angle detection device, a motor, and a transportation device, by which the abnormality can be detected promptly without the necessity of any complicated operations. There is provided a circuit configured to switch between a sine wave and a direct current voltage to be supplied, as an excitation signal of a resolver (2). Then, immediately after the power is turned on, the direct current voltage is applied to the resolver (2), and the output voltages of the phases of the resolver (2) are measured when the direct current voltage is applied. In this situation, the output voltages of the phases are compared with each other. When none of them matches each other, it is determined that an abnormality (short-circuit abnormality, short-circuiting) occurs at the resolver (2).

3 Claims, 4 Drawing Sheets

(51) Int. Cl.
*G01D 3/028* (2006.01)
*G01D 5/20* (2006.01)
*G01D 18/00* (2006.01)

(52) U.S. Cl.
CPC .......... *G01D 18/00* (2013.01); *H02P 29/024* (2013.01); *H02P 29/0241* (2016.02)

(58) Field of Classification Search
CPC ...... G01D 5/2093; G01D 3/028; G01D 18/00; G01B 7/30; H02P 29/0241; H02P 29/024
See application file for complete search history.

(56) References Cited

U.S. PATENT DOCUMENTS

| | | | | |
|---|---|---|---|---|
| 2011/0029178 A1* | 2/2011 | Kawakami | ........... | G05B 13/026 701/22 |
| 2011/0127938 A1* | 6/2011 | Kawakami | ............. | G01P 3/481 318/400.13 |
| 2014/0207335 A1* | 7/2014 | Mikamo | ................ | B62D 5/046 701/41 |
| 2014/0361720 A1* | 12/2014 | Miyachi | .................. | H02P 29/50 318/400.39 |

FOREIGN PATENT DOCUMENTS

| | | |
|---|---|---|
| JP | 2011-169654 A | 9/2011 |
| JP | 2013-44679 A | 3/2013 |

OTHER PUBLICATIONS

International Search Report (PCT/ISA/210) issued in PCT Application No. PCT/JP2013/007484 dated Feb. 4, 2014 with English-language translation (two (2) pages).
Japanese Office Action issued in counterpart Japanese Application No. 2013-103395 dated Feb. 4, 2015 with English-language translation (four (4) pages).
Decision to Grant a Patent issued in counterpart Japanese Application No. 2013-103395 dated May 7, 2014 (three (3) pages).
Chinese Office Action issued in counterpart Chinese Application No. 201380002616.6 dated Dec. 3, 2015 with English-language translation (nine (9) pages).
English machine translation of the description of JP2008197061, obtained from the EPO website (http://worldwide/espacenet.com/advancedSearch?locale=en_EP), 11 pages, obtained on May 16, 2016.
International Preliminary Report on Patentability (PCT/IB/373) dated Nov. 17, 2015 (one (1) page), issued in PCT/JP/2013/007484, with English translation of Written Opinion of the International Searching Authority (PCT/ISA/237) (three (3) pages).
Extended European Search Report issued in counterpart European Application No. 13884770.2 dated Dec. 8, 2016 (seven (7) pages).

* cited by examiner

METHOD FOR DETECTING ABNORMALITY OF RESOLVER, ANGLE DETECTION DEVICE, MOTOR, AND TRANSPORTATION DEVICE

CROSS REFERENCE TO RELATED APPLICATIONS

This application is a continuation of U.S. patent application Ser. No. 14/888,462, filed Nov. 2, 2016, the entire disclosure of which is incorporated by reference herein, which is the U.S. national phase of International PCT Application No. PCT/JP2013/007484, filed Dec. 19, 2013, which in turn claims priority to Japanese Patent Application No. 2013-103395, filed May 15, 2013, the priority of which is also claimed by the present application.

TECHNICAL FIELD

The present invention relates to a method for detecting an abnormality of a resolver configured to detect a rotating position of a rotating body, an angle detection device having a function of detecting the abnormality of the resolver, and a motor and a transportation device each having the angle detection device.

BACKGROUND ART

In one technology, as a method for detecting an abnormality of a resolver to be used for detecting a rotating angle of an electric motor or the like, for example, there is a technique disclosed in Patent Literature 1. In this technique, in synchronization with a maximum value or a minimum value of an excitation signal of the resolver, each resolver output signal is sampled, and when an offset of the sampled value falls out of a given range near 0, it is determined that an abnormality occurs at the resolver.

In addition, as another method for detecting the abnormality of the resolver, for example, there is a technique disclosed in Patent Literature 2. In this technique, different values are set to the respective voltage transformation ratios between the excitation coil and the respective three resolver coils, and when three rotor electrical angles (operation electrical angles) operated from the three-phase resolver signal indicate different values from one another, it is determined that a short-circuit abnormality occurs at the resolver.

CITATION LIST

Patent Literature

PLT 1: JP 2001-343253 A
PLT 2: JP 2013-044679 A

SUMMARY

Technical Problem

In the technique disclosed in Patent Literature 1, however, as the abnormality of the resolver is detected by the offset of the sampling signal, an abnormality cannot be detected unless the rotating angle reaches 180 degrees of the electrical angle at maximum. Therefore, until the abnormality detection is performed, the motor is controlled by using an abnormal signal and an adverse effect may be given to the motor revolution behavior.

Besides, in the technique disclosed in Patent Literature 2, amplitude components are respectively extracted from the three-phase resolver signal, and the operation electrical angle is operated in three methods from the extracted amplitude values. Hence, complicated operations are needed for detection of the short-circuit abnormality of the resolver.

Therefore, it is an object of the present disclosure to provide a method for detecting an abnormality of a resolver, an angle detection device, a motor, and a transportation device, by which the abnormality can be detected promptly without the necessity of any complicated operations.

Solution to Problem

In order to address the above issues, in one embodiment of the present disclosure, there is provided a method for detecting an abnormality of a resolver, the method including: applying a direct current voltage to the resolver configured to output rotating positional information of a rotating body, as an electrical signal; and comparing output voltages of phases of the resolver, when the direct current voltage is applied to detect the abnormality of the resolver.

In this manner, although the resolver is excited by use of a sine wave in general, the direct current voltage is applied to the resolver and the resolver signal output as a result is confirmed, so as to determine whether or not an abnormality occurs at the resolver. In this manner, by use of the fact that the resolver output signals when the direct current is applied to the resolver have all the same potentials in a normal state, the output voltages of the respective phases of the resolver are compared with each other to detect an abnormal state. Therefore, no complicated operation is necessary. Further, the abnormal state can be detected without rotating a rotor.

In addition, in the above-described method for detecting the abnormality of the resolver, when the output voltages of phases of the resolver do not match each other, it may be determined that the abnormality occurs at the resolver.

Accordingly, the abnormal state of the resolver can be detected with a simple configuration appropriately.

Further, in another embodiment of the present disclosure, there is provided an angle detection device, including: a resolver configured to output rotating positional information of a rotating body, as an electrical signal; a sine wave generator configured to generate a sine wave signal; a direct current voltage generator configured to generate a direct current voltage; an excitation signal supplier configured to select one of the sine wave signal generated by the sine wave generator or the direct current voltage generated by the direct current voltage generator, and to supply the selected one to the resolver as an excitation signal; a voltage measurement portion configured to measure output voltages of phases of the resolver; and an abnormality detector configured to detect an abnormality of the resolver, by comparing the output voltages of the phases of the resolver measured by the voltage measurement portion, when the excitation signal supplier supplies the direct current voltage generated by the direct current voltage generator, as the excitation signal.

In this manner, it is possible to switch between the sine wave and the direct current voltage to be supplied to the resolver. Hence, after the direct current voltage is applied and the abnormality is determined, switching is made to the sine wave so that the general angle detection can be carried out.

Moreover, in the above-described angle detection device, the excitation signal supplier may be configured to select the direct current voltage generated by the direct current voltage generator and to supply the direct current voltage to the resolver, as the excitation signal, immediately after power is turned on.

In this manner, immediately after the power is turned on, the direct current voltage is applied to the resolver and the abnormality is determined. Hence, it is possible to confirm that the resolver is in a normal state, and then it is possible to detect the angle. Thus, the reliability of the angle detection can be improved.

Furthermore, in yet another embodiment of the present disclosure, there is provided a motor including the above-described angle detection device.

Additionally, in further another embodiment of the present disclosure, there is provided a transportation device configured to transport a transportation target by using the above-described motor.

Advantageous Effects

According to the present disclosure, the abnormality of the resolver can be detected promptly without the necessity of the rotor revolution. In addition, since an abnormal determination is made possible by a simple comparing operation, it is possible to achieve an abnormality detection function at a low cost.

DESCRIPTION OF EMBODIMENTS

Hereinafter, embodiments of the present disclosure will be described with reference to the attached drawings.

Figure 1:
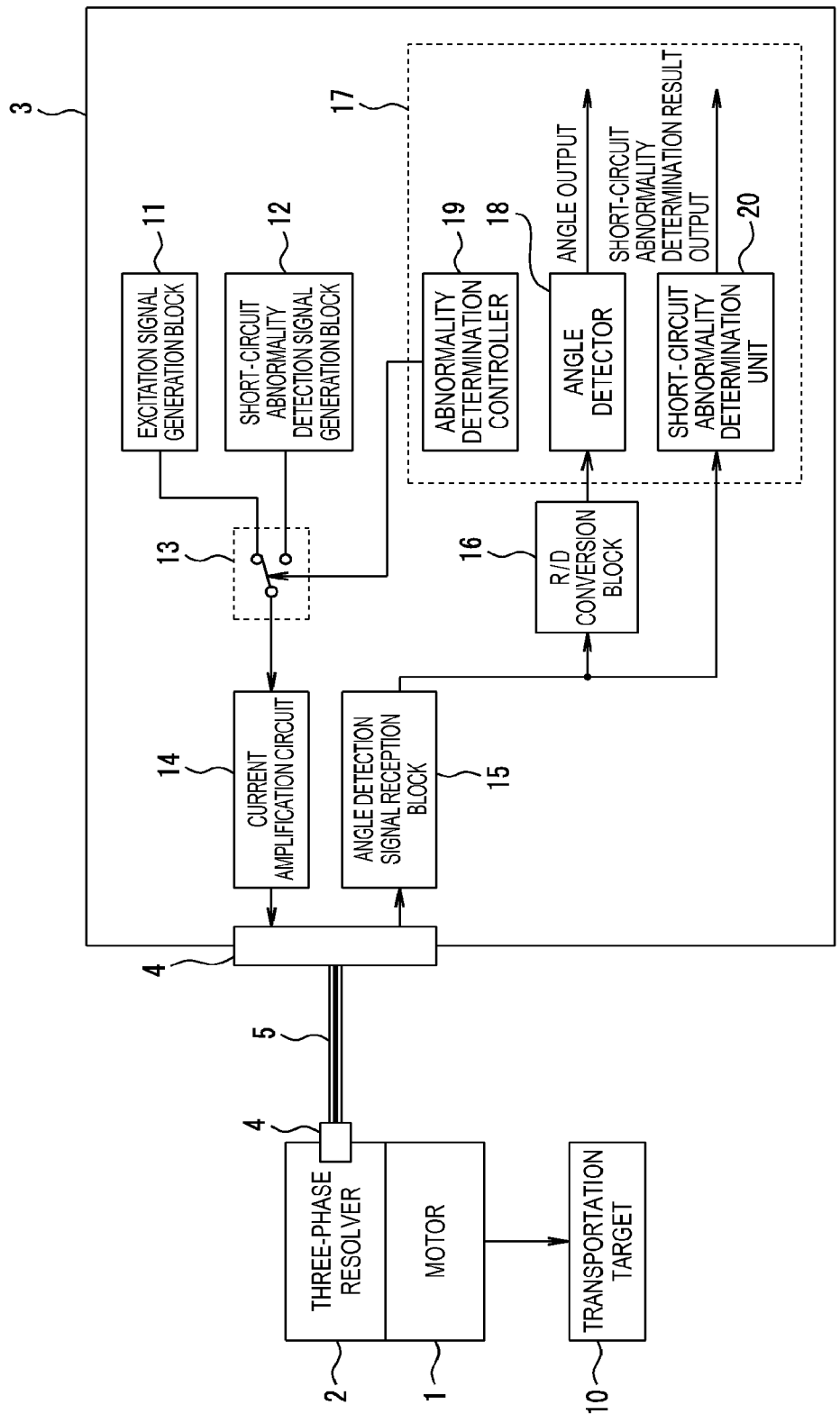
FIG. 1 is a schematic configuration view of an angle detection device in one embodiment of the present disclosure.

FIG. 1 is a schematic configuration view of an angle detection device, in one embodiment of the present disclosure.

In the drawing, reference numeral 1 indicates a motor (rotating body), reference numeral 2 indicates a resolver configured to detect a rotating position of the motor 1. Herein, the motor 1 is, for example, a direct drive motor included in a transportation device, and serves as a drive source configured to drive a transportation target 10.

In addition, a servo motor includes the motor 1, a resolver 2, and a drive unit 3, to be described later. It is to be noted that a mega torque motor can be used as the motor 1.

The resolver 2 is configured to include a cylindrical stator, and a rotor configured to hold a rotation shaft and arranged rotatably in the stator, and to change a reluctance between the rotor and the stator depending on the location of the rotor so that one cycle of a fundamental wave component of the reluctance change indicates one revolution of the rotor. In other words, when the inner diameter center of the rotor is aligned with the inner diameter center of the stator, the outer diameter center of the rotor is configured to be eccentric by only a certain eccentric amount from the inner diameter center thereof to change the thickness of the rotor. Hence, the reluctance changes depending on the location of the rotor.

The resolver 2 is a three-phase resolver configured, when a since wave shaped excitation signal is given from the outside, to output a resolver signal of phase A changing depending on the turning angle of the rotation shaft, a resolver signal of phase B, which is different in phase by 120 degrees from the resolver signal of phase A, and a resolver signal of phase C, which is different in phase by 120 degrees from the resolver signal of phase B.

The resolver 2 and the drive unit 3 are connected by an electrical cable 5 through a connector 4. The electrical signal (resolver signal) output from the resolver 2 is transmitted to the drive unit 3 through the electrical cable 5.

The drive unit 3 is configured to have a position detection function of detecting the rotating position (turning angle) of the motor 1, and an abnormality detection function of detecting a short-circuit abnormality between phases of the resolver 2. The position detection function is a function of acquiring a resolver signal transmitted from the resolver 2 as rotating positional information of the motor 1, and detecting a rotating position (turning angle) of the motor 1 based on the resolver signal. In addition, the abnormality detection function is a function of detecting short-circuiting/short-circuit abnormality of the resolver 2, immediately after the power is turned on.

This drive unit 3 is configured to include an excitation signal generation block 11, a short-circuit abnormality detection signal generation block 12, a change-over switch 13, and a current amplification circuit 14.

The excitation signal generation block 11 is configured to generate a sine wave signal, and then to output the sine wave signal. In addition, the short-circuit abnormality detection signal generation block 12 is configured to generate a direct current voltage as a short-circuit abnormality detection signal, and then to output the short-circuit abnormality detection signal.

The change-over switch 13 is configured to switch between the sine wave signal from the excitation signal generation block 11 and the direct current voltage from the short-circuit abnormality detection signal generation block 12 in response to a switch signal S1 from an abnormality determination controller 19 to be described later, to output to the current amplification circuit 14. Herein, the change-over switch 13 is configured to select and output the sine wave signal from the excitation signal generation block 11 when the switch signal S1=0, and to select and output the direct current voltage from the short-circuit abnormality detection signal generation block 12 when the switch signal S1=1.

The current amplification circuit 14 is configured to amplify the signal output from the change-over switch 13, and to supply the amplified signal as an excitation signal to the resolver 2 through the electrical cable 5.

Furthermore, the drive unit 3 is configured to include an angle detection signal reception block 15, an R/D conversion block 16, and a CPU 17. In addition, the CPU 17 is configured to include an angle detector 18, an abnormality determination controller 19, and a short-circuit abnormality determination unit 20.

The angle detection signal reception block 15 is configured to receive inputs of the three-phase resolver signal output from the resolver 2 when the excitation signal is applied. Herein, the resolver signal is a three-phase analog signal of the phase A, the phase B, and the phase C, each being different in phase by 120 degrees. The angle detection signal reception block 15 is configured to convert the three-phase resolver signal that has been input into a two-phase signal and to output the two-phase signal to the R/D conversion block 16, and in addition, to detect the voltage of the three-phase resolver signal that has been input and to output the detected voltage to the short-circuit abnormality determination unit 20, to be described later, of the CPU 17.

Figure 2:
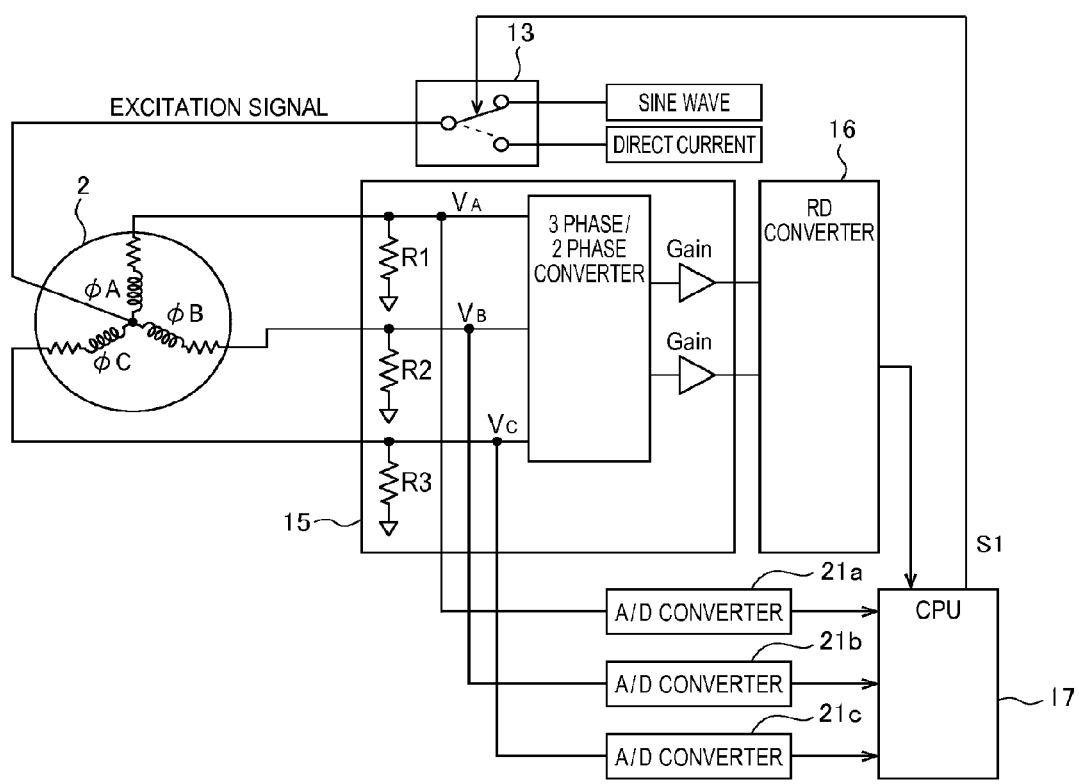
FIG. 2 is a circuit diagram illustrative of a configuration of the angle detection device.

In other words, the angle detection signal reception block 15 has a configuration illustrated in FIG. 2. As illustrated in FIG. 2, the angle detection signal reception block 15 is configured to include shunt resistances R1, R2, and R3, and to detect voltages ($V_A$, $V_B$, and $V_C$) of the resolver by using the shunt resistances R1 to R3. In this situation, the resistance values of the shunt resistances R1 to R3 are all set to the same values. The respective phase voltages $V_A$ to $V_C$ are converted into digital values by A/D converters 21a to 21c, and then are input into the CPU 17 (the short abnormality determination unit 20).

Further, after the three-phase resolver signal are converted to the two-phase resolver signal with a three phase/two phase converter, the angle detection signal reception block 15 is configured to input the two-phase resolver signal into the R/D conversion block (RD converter) 16.

The R/D conversion block 16 is configured to convert an output signal from the resolver 2 into a digital angle data, and to input the digital angle data into the angle detector 18 of the CPU 17, as illustrated in FIG. 1. The angle detector 18 is configured to acquire the angle data that has been output from the R/D conversion block 16, and to use the angle data for various kinds of control (motor control and the like).

In addition, the abnormality determination controller 19 of the CPU 17 is configured to output the switch signal S1=0, while a short-circuit abnormality determination process of determining a short-circuit abnormality of the resolver 2 is being performed, and to output the switch signal S1=1 in any other case. In one embodiment of the present disclosure, the short-circuit abnormality determination process is configured to be carried out for a certain period of time after the power is turned on, and the switch signal S1=1 is output.

The short-circuit abnormality determination unit 20 of the CPU 17 is configured to carry out the short-circuit abnormality determination process based on the respective phase voltages $V_A$ to $V_C$ output from the angle detection signal reception block 15, while the abnormality determination controller 19 is outputting the switch signal S1=1. A short-circuit abnormality determination result is configured to be output to the outside so that a given abnormality process should be carried out. For example, the drive control of the motor 1 can be stopped as an abnormality process.

Next, a short-circuit abnormality determination process to be carried out by the CPU 17 will be described specifically.

Figure 3:
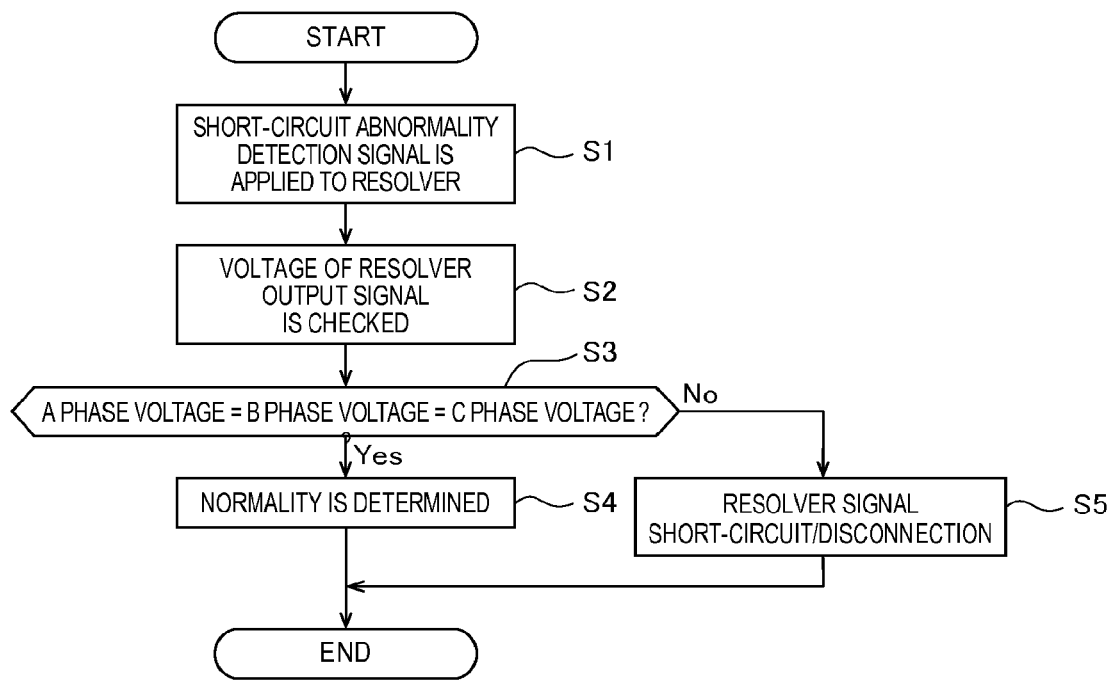
FIG. 3 is a flow chart illustrative of a short-circuit abnormality determination procedure.

FIG. 3 is a flowchart illustrative of the short-circuit abnormal determination procedure. The short-circuit abnormality determination process starts, when the power is turned on.

Firstly, at step S1, the abnormality determination controller 19 outputs the switch signal S1=1 to the change-over switch 13. Accordingly, the change-over switch 13 is in a state indicated by a broken line of FIG. 2, and the short-circuit abnormality detection signal (DC voltage) generated by the short-circuit abnormality detection signal generation block 12 is applied to the three-phase resolver 2.

Next, at step S2, the short-circuit abnormality determination unit 20 acquires the voltages of the resolver output signals output from the three-phase resolver 2. The voltages of the resolver output signals to be acquired here are values obtained by the A/D converters 21a to 21c converting the respective phase voltages $V_A$ to $V_C$ of the resolver 2 detected by the angle detection signal reception block 15 into digital values.

At step S3, it is determined whether or not the respective phase voltage values acquired at step S2 are all equal. Then, when it is determined that all values have equal potentials at step S4, processing goes to step S4, whereas when it is determined that all values do not have equal potentials at step S4, processing goes to step S5.

At step S4, it is determined that the resolver signal is in a normal state, that is, it is determined that no short-circuit abnormality or short-circuiting occurs at the resolver 2, a short-circuit abnormality determination result indicating "normal state" is output, and then the short-circuit abnormality determination process ends.

On the other hand, at step S5, it is determined that the resolver signal is in a short-circuit state or in an open state, a short-circuit abnormality determination result indicating "abnormal state" is output, and then the short-circuit abnormality determination process ends.

As described above, after the power is turned on, the DC voltage is applied to the three-phase resolver 2, as the excitation signal. The impedance characteristic of the resolver coil is jωL (ω: angular acceleration, L: inductance), and the angular acceleration of the DC voltage is 0 rad/s$^2$. Hence, when the DC voltage is applied, the impedance is 0Ω. Therefore, when the resolver signal is in a normal state, the voltages available at the shunt resistances R1 to R3 when the DC voltage is applied are all equal. On the other hand, when the resolver signal is in an abnormal state (short-circuit state, open state), the voltages available at the shunt resistances R1 to R3 when the DC voltage is applied are all different from one another.

Thus, the abnormal state of the resolver 2 can be detected by use of the fact that the voltages made available at the shunt resistances R1 to R3 when the DC voltage is applied change depending on whether the resolver signal is in an abnormal state (short-circuit state, open state) or in a normal state.

It is to be noted that in FIG. 1, the excitation signal generation block 11 corresponds to a sine wave generator, the short-circuit abnormality detection signal generation block 12 corresponds to a direct current voltage generator, the change-over switch 13 and the current amplification circuit 14 correspond to an excitation signal supplier, the angle detection signal reception block 15 corresponds to a voltage measurement portion, and the short-circuit abnormality determination unit 20 corresponds to an abnormality detector.

Thus, in one embodiment of the present disclosure, an abnormality of the resolver 2 can be determined without the need of the rotor revolution. Thus, when an abnormality occurs at the resolver 2, the abnormality can be detected promptly.

Furthermore, since the DC voltage is applied to the resolver 2 immediately after the power is turned on and an abnormality determination is made, it is possible to start the general angle detection after the resolver 2 is confirmed to be in a normal state. Therefore, it is possible to prevent the motor control with an abnormality signal.

Now, as another method of detecting an abnormality of the resolver, different values are set to the respective voltage transformation ratios between the excitation coil and the respective three resolver coils, and when three rotor electrical angles (operation electrical angles) which have been operated from the three-phase resolver signal indicate different values from one another, it is determined that the short-circuit abnormality occurs at the resolver.

In contrast, in one embodiment of the present disclosure, all the voltage transformation ratios of the resolver 2 that are same can be realized. In addition, as an abnormality of the resolver 2 can be detected in a simple comparing operation, such a method is achievable at a low cost.

It is to be noted that in one embodiment of the present disclosure as described above, by comparing the respective phase voltages $V_A$ to $V_C$ of the resolver 2 with digital values converted by the A/D converters 21a to 21c, respectively, determination of the short-circuit abnormality has been described. However, the short-circuit abnormality can be determined by use of a comparator.

Further, in one embodiment of the present disclosure as described above, the case where the resolver configured to output the resolver signals of the phase A, the phase B, and the phase C is applied has been described. However, a resolver configured to output the resolver signal of four or more phases is also applicable.

Figure 4:
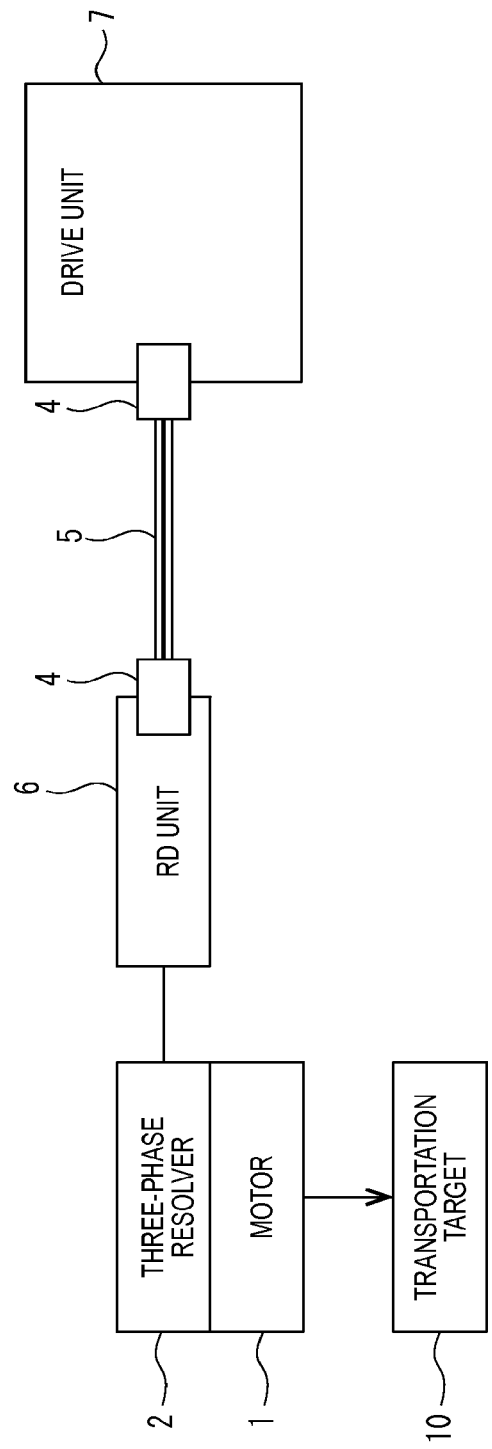
FIG. 4 is a schematic configuration view illustrative of the angle detection device in another embodiment of the present disclosure.

Furthermore, in one embodiment of the present disclosure as described above, as illustrated in FIG. 4, a servomotor can be configured with the motor 1, the resolver 2, an RD unit 6, and the drive unit 7. In this case, the RD unit 6 and the drive unit 7, which are assembled with the resolver 2, are configured to be connected with the electrical cable 5 through the connector 4.

The RD unit 6 is configured to have functions of the above-described angle detection signal reception block 15 and the R/D conversion block 16. The drive unit 7 is configured to have functions of the excitation signal generation block 11, the short-circuit abnormality detection signal generation block 12, the change-over switch 13, the current amplification circuit 14, and the CPU 17. Then, the signal output from the RD unit 6 is transmitted to the drive unit 7 through the electrical cable 5, so that the angle detection of the resolver 2 and the short-circuit abnormality determination can be carried out.

INDUSTRIAL AVAILABILITY

According to the method of detecting an abnormality of the resolver in the present disclosure, the abnormality of the resolver can be detected promptly without the need of the rotor revolution. In addition, as an abnormality determination is made possible by a simple comparing operation, the abnormality detection function can be realized at a low cost and it is useful.

REFERENCE SIGNS LIST

1 . . . motor (rotating body), 2 . . . resolver, 3 . . . drive unit, 4 . . . connector, 5 . . . electrical cable, 11 . . . excitation signal generation block, 12 . . . short-circuit abnormality detection signal generation block, 13 . . . change-over switch, 14 . . . current amplification circuit, 15 . . . angle detection signal reception block, 16 . . . R/D conversion block, 17 . . . CPU, 18 . . . angle detector, 19 . . . abnormality determination controller, 20 . . . short-circuit abnormality determination unit, 21a-21c . . . A/D converter

The invention claimed is:

1. An angle detection device, comprising:
a three-phase resolver configured to output rotating positional information of a rotating body as an electrical signal, the three-phase resolver being configured to output a three-phase resolver signal in response to an excitation signal given to the three-phase resolver, the three-phase resolver signal including a resolver signal of phase A changing depending on a turning angle of a rotation body, a resolver signal of phase B, which is different in phase by 120 degrees from the resolver signal of phase A, and a resolver signal of phase C, which is different in phase by 120 degrees from the resolver signal of phase B;
a sine wave generator configured to generate a sine wave signal;
a direct current voltage generator configured to generate a direct current voltage;
an abnormality determination controller configured to output a switch signal S1, the switch signal S1 being "1" while an abnormality determination process of determining an abnormality of the three-phase resolver is being performed, and the switch signal S1 being "0" in any other case;
an excitation signal supplier configured to select the sine wave signal from the sine wave generator to supply the sine wave signal to the three-phase resolver as an excitation signal when the switch signal S1 from the abnormality determination controller is "0", and to select the direct current voltage from the direct current voltage generator to supply the direct current voltage to the three-phase resolver as the excitation signal when the switch signal S1 is "1";
a voltage measurement portion configured to measure output voltages of the phases of the three-phase resolver signal output from the three-phase resolver; and
an abnormality detector configured to determine that the three-phase resolver is in a normal state when the output voltages of the phases of the three-phase resolver signal are all equal, each of the output voltages being outputted in response to the direct current voltage supplied by the excitation signal supplier as the excitation signal, and being measured by the voltage measurement portion, to determine that the three-phase resolver is in an abnormal state when all output voltages of the phases of the three-phase resolver signal do not have equal potentials.

2. The angle detection device according to claim 1, wherein the excitation signal supplier is configured to select the direct current voltage generated by the direct current voltage generator and to supply the direct current voltage to the resolver, as the excitation signal, immediately after power is turned on.

3. A motor including an angle detection device, the angle detection device comprising:
a three-phase resolver configured to output rotating positional information of a rotating body as an electrical signal, the three-phase resolver being configured to output a three-phase resolver signal in response to an excitation signal given to the three-phase resolver, the three-phase resolver signal including a resolver signal of phase A changing depending on a turning angle of a rotation body, a resolver signal of phase B, which is different in phase by 120 degrees from the resolver signal of phase A, and a resolver signal of phase C, which is different in phase by 120 degrees from the resolver signal of phase B;
a sine wave generator configured to generate a sine wave signal;
a direct current voltage generator configured to generate a direct current voltage;
an abnormality determination controller configured to output a switch signal S1, the switch signal S1 being "1" while an abnormality determination process of determining an abnormality of the three-phase resolver is being performed, and to output the switch signal S1 being 0 in any other case;

an excitation signal supplier configured to select the sine wave signal from the sine wave generator to supply the sine wave signal to the three-phase resolver as an excitation signal when the switch signal S1 from the abnormality determination controller is "0", and to select the direct voltage from the direct current voltage generator to supply the direct current voltage to the three-phase resolver as the excitation signal when the switch signal S1 is "1";

a voltage measurement portion configured to measure output voltages of phases of the three-phase resolver signal output from the three-phase resolver; and an abnormality detector configured to determine that the three-phase resolver is in a normal state when the output voltages of the phases of the three-phase resolver signal are all equal, each of the output voltages being outputted in response to the direct current voltage supplied by the excitation signal supplier as the excitation signal, and being measured by the voltage measurement portion, to determine that the three-phase resolver is in an abnormal state when all output voltages of the phases of the three-phase resolver signal do not have equal potentials.

* * * * *